(12) United States Patent
Frye et al.

(10) Patent No.: US 6,188,765 B1
(45) Date of Patent: *Feb. 13, 2001

(54) PORTABLE RADIOTELEPHONE

(75) Inventors: Dale James Frye, Port Hueneme; Jeffrey Alan Higashi, Gardena, both of CA (US)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/087,051

(22) Filed: May 29, 1998

(51) Int. Cl.[7] ..................................................... H04M 1/00
(52) U.S. Cl. ............................................................ 379/433
(58) Field of Search .................................... 379/433, 428; 455/90, 575

(56) References Cited

U.S. PATENT DOCUMENTS 5,933,330 * 8/1999 Beutler et al. ........................ 379/433
5,987,122 * 11/1999 Daffara et al. ....................... 379/433

FOREIGN PATENT DOCUMENTS 2 300 880   11/1995   (GB) .

* cited by examiner

Primary Examiner—Jack Chiang
(74) Attorney, Agent, or Firm—Perman & Green, LLP

(57) ABSTRACT

A folding portable radiotelephone designed to be opened from a closed position using only one hand.

14 Claims, 3 Drawing Sheets

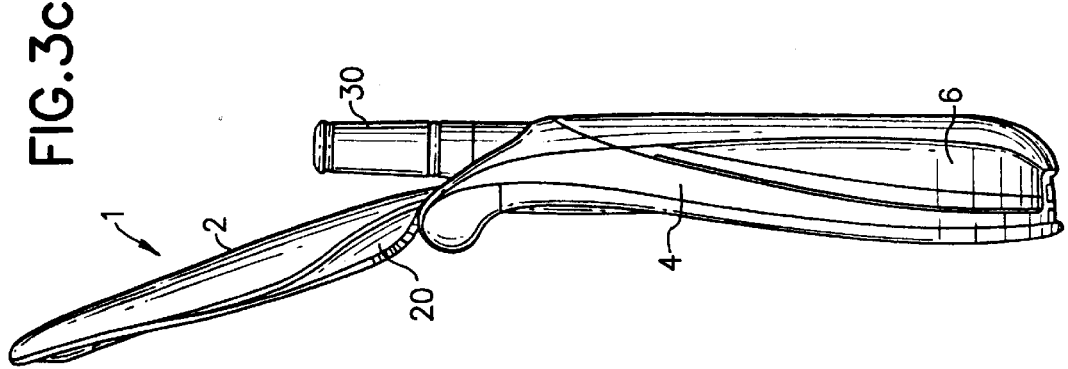
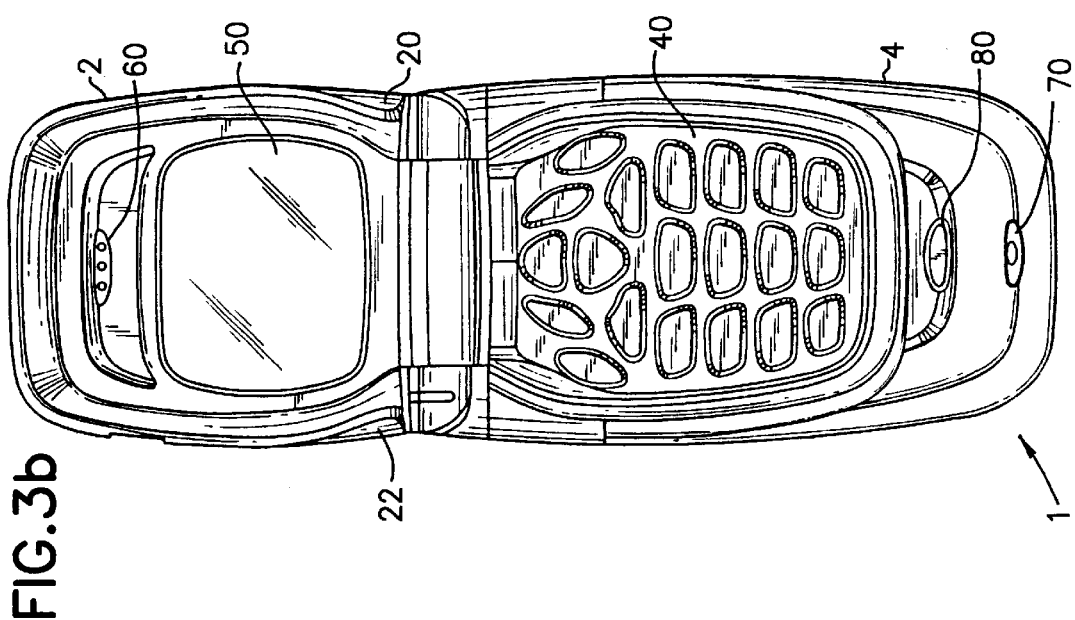
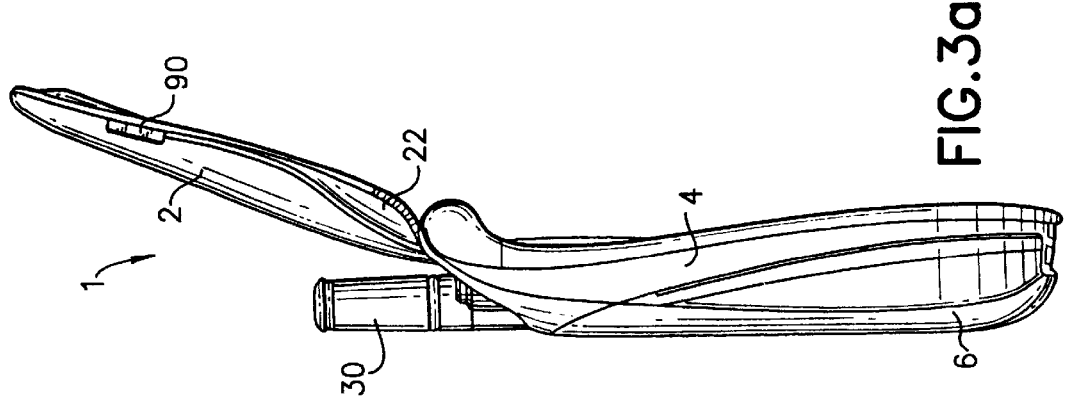

PORTABLE RADIOTELEPHONE

FIELD OF THE INVENTION

The present invention relates to handsets for portable radiotelephones of the folding or 'clamshell' type. Specifically it relates to an apparatus for enabling the telephone to be opened easily, particularly by using only one hand.

BACKGROUND OF THE INVENTION

There is an increasing trend towards smaller portable radiotelephones. One way of achieving a smaller profile for the telephone when not in use, whilst retaining a functional separation between earpiece and microphone whilst in use, is to configure the telephone such that it folds up when not in use. This configuration has become popular with consumers.

In order to enhance the ease of use of such phones, it is desirable to be able to open the telephone using only one hand. With prior art solutions, both hands must generally be used. One hand is used to hold the lower portion of the telephone while the other hand grips the upper portion and moves it into an open position.

Alternatively, it is possible to configure the telephone such that a pushbutton may be used to activate a spring mechanism within the hinge which automatically opens the telephone. Such a mechanism is described in GB Patent Application 2300880A. Such mechanisms, however, are complex and expensive. It is desirable to keep the hinge design as simple, and hence as inexpensive, as possible.

SUMMARY OF THE INVENTION

According to a first aspect of the present invention, there is provided a handset comprising a cover and a base, said handset being operable to move between an open position in which said cover and base are arranged to allow access to a plurality of keys, and a closed position, the cover being attached for rotation with respect to the base about a hinge axis and comprising:

a first formation enabling a first force to be applied to rotate the cover about the hinge axis to open the handset; and a second formation enabling a second force to be applied to rotate the cover about the hinge axis to open the handset, the first and second formations being on opposing sides of the hinge axis.

Advantageously, this assists a user of the handset in being able to open the telephone using only one hand.

A suitable formation may be provided by a projection.

Preferably, the projection is a ridge positioned proximal and substantially parallel to the axis of the hinge.

Advantageously, this provides a relatively large site to which finger pressure can be applied.

Suitably, the second formation is a recess in the profile of the closed handset.

This does not impact adversely the aesthetic design of the handset.

Preferably, the second formation is adjacent the hinge.

This provides the most advantageous position for such a formation, as the mobility of a user's fingers and thumb is restricted when holding the handset.

Preferably, a second recess is provided adjacent the hinge.

This allows left-handed users to use the handset as easily as right-handed users. Alternatively, users may wish to use both recesses simultaneously.

Suitably, the cover comprises a display.

Suitably, the cover is movable between two endpoints, and the effort required to move the cover is provided by a user of the handset.

Suitably, the base comprises a housing for a battery.

According to a second aspect of the present invention, there is provided a portable radiotelephone comprising a cover and a base, said cover and base being hingedly connected together towards one end of the telephone, said telephone being operable in an open position in which said cover and base are arranged to allow access to a plurality of keys, and a closed position in which the profile of the telephone is minimised, wherein means are provided to facilitate opening of said telephone, said means comprising:

a first formation, positioned on the cover of the telephone towards a first end of the cover, enabling a first force to be applied to said hinge; and a second formation, positioned on the cover of the telephone towards an opposite end of the cover to said first end, enabling a second force to be applied to said hinge, such that said first and second forces produce a turning moment causing the telephone to move from a closed to an open position.

BRIEF DESCRIPTION OF THE DRAWINGS

FIG. 3a shows a side view of the telephone in the open position.

FIG. 3b shows a front view of the telephone in the open position.

FIG. 3c shows another side view of the telephone in the open position.

DETAILED DESCRIPTION OF THE INVENTION

Figure 1:
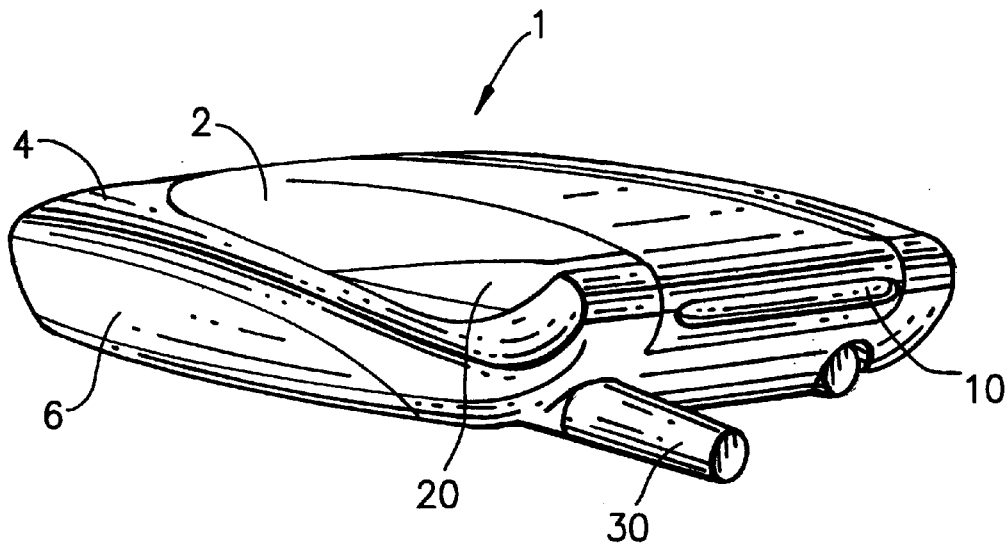
FIG. 1 shows a projection of the telephone in the closed position.

The telephone 1 comprises two parts which are joined together with a hinge mechanism. This configuration is popularly known as a 'clamshell'. The arrangement of components between the two parts of the telephone can vary. Typically, the lower part, hereafter called the base 4 i.e. the part containing the microphone 70, is bulkier and houses the majority of the electronic circuitry. The upper part, hereafter called the cover 2, typically houses the earpiece 60.

In the closed position, the hinge which connects the base and the cover is positioned towards the upper end of the telephone. When the telephone is open, the hinge resides between the earpiece 60 and the microphone 80.

In the embodiment herein described, the base 4, as shown in the drawings, includes the following components of the telephone: battery compartment 6, battery, antenna 30, keypad 40, power switch 80, microphone 70, system connector, analog and digital processing means. The cover includes the earpiece 60, ringer 90 and the display 50 for displaying information on the status of the telephone.

In this embodiment, the battery is included in the base of the telephone, inside the battery compartment 6. It is possible to install the battery in the cover 2, as is the case in the Motorola® Star-Tac telephone, but positioning the single bulkiest component of the telephone in the base 4 allows the cover 2 to be made smaller.

Figure 2C:
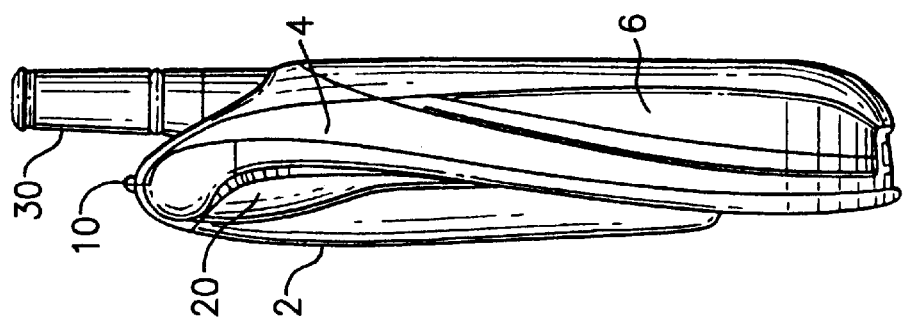
FIG. 2c shows another side view of the telephone in the closed position.
Figure 2B:
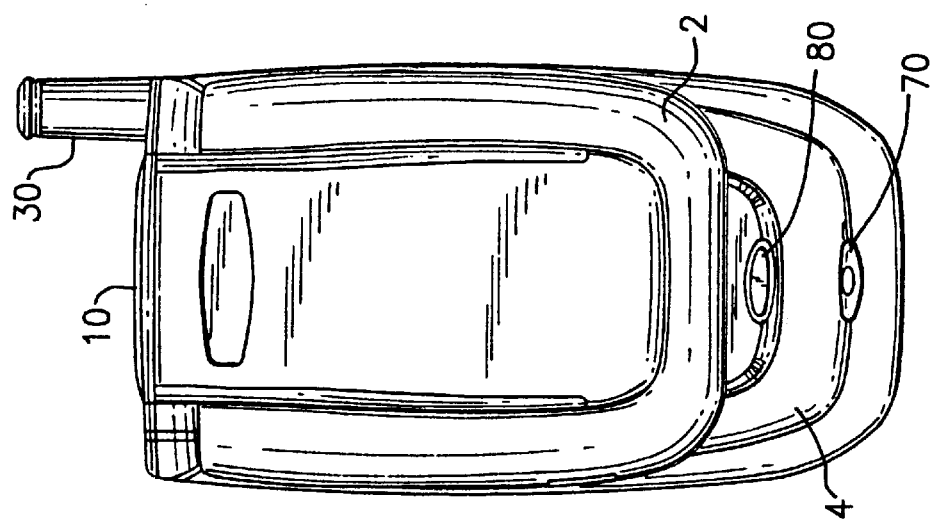
FIG. 2b shows a front view of the telephone in the closed position.

In the closed position as shown in FIG. 2b, the cover 2 conceals nearly all the base 4, leaving only the microphone 70 and the power switch 80 exposed. Having the power switch 70 exposed when the cover 2 is closed allows the user to switch the telephone on or off without having to open the cover. The antenna 30 extends from the upper right corner of the base as shown. The antenna may be of the helical or rod type. The hinge connecting cover 2 and base 4 is positioned at the upper end of the telephone in this closed position.

In normal use, the telephone is maintained in the closed position until a call is to be made or answered, enabling it to be carried conveniently and discreetly.

In order to dial another party, the telephone must be opened to expose the keypad 40, thus allowing the user to either enter a number directly with the numbered keys, or alternatively dial a pre-stored number using the telephone's memory facility.

Once opened in this way, the telephone forms a profile which allows the earpiece 60 and microphone 70 to be positioned near the ear and mouth respectively, and resembles more traditional one-piece phones. This is shown in FIGS. 3a to 3c.

FIGS. 3a to 3c also show the full extent to which the cover opens under normal use. If the endstop limiting the extent of opening is exceeded, for example by someone accidentally sitting on the telephone, the hinge mechanism will rotate beyond the endstop in order to prevent damage to the telephone. In order to close the telephone again, it is necessary to force the cover past the endstop towards the closed position. When opened, the telephone will then not exceed the endstop again unless excessive force is used.

Unlike so-called flip telephones where a cover element is provided which covers only part of the base of the telephone, clamshell telephones are configured such that when the telephone is in the closed position, the cover substantially conceals a surface of the base 4. Clamshell telephones tend to differ from flip telephones in that the cover houses the earpiece 60 rather than the microphone 70.

A problem with existing clamshell telephones is that it is generally necessary to use both hands to open the clamshell so as to be able to make or answer a call. This is due to the position of the hinge, and that when holding the telephone in the hand, the mobility of the user's fingers and thumb is limited.

An advantage of a telephone according to the present invention is that one-handed opening of the telephone is facilitated.

It is difficult to produce a handset where a single force can be used to open the telephone from a closed position. The present embodiment alleviates this problem by providing multiple points to which a force can be applied. The multiple forces combine to produce a single turning moment which acts to move the first and second parts of the telephone apart, and hence into an open position.

Since the effort required to open the telephone is rotational in nature, i.e. a moment or a torque, the various forces required may be in different linear directions. The present embodiment makes use of this fact to enable two distinct forces of substantially opposite linear directions to co-operate to produce the required turning moment.

In the particular embodiment described, the first point to which a force may be applied is realised with a ridge 10 on the cover 2 running substantially parallel to the hinge axis. It should be noted that an identical effect may be achieved using a projection of shorter length, an indentation in the structure of the cover of the telephone, or indeed, any feature to which the user may apply a force.

Similarly, the formation 20 is realised as an undercut in the body of the cover 2, and could be realised via a more pronounced projection from the cover, such as a tab. The skilled man will realise that any formation to which a force can be applied would serve the purposes of the invention equally well.

Providing formations to which the user may apply a force could tend to adversely affect the aesthetic design of a telephone. In the present embodiment, these features, particularly the undercut regions 20, 22 of the cover, actually contribute to the aesthetic appeal of the telephone.

Figure 4:
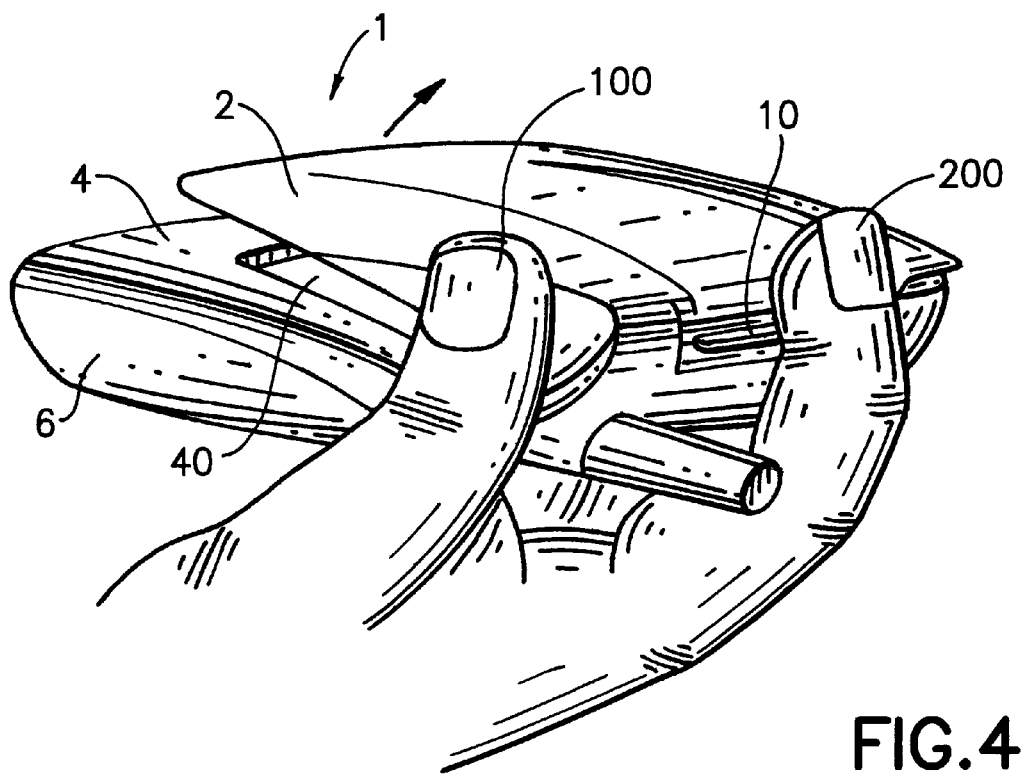
FIG. 4 shows the telephone being opened.

FIG. 4 shows how the telephone may be opened according the present invention. With the telephone held firmly by the base 4, the user applies a relatively downward force to ridge 10 with forefinger 200, while simultaneously applying a relatively upward force to formation 20 with thumb 100. The effect of these two individual forces is to produce a turning moment about the axis of the hinge connecting the cover 2 and base 4 of the telephone 1. This turning moment acts to move the cover 2 away from the base 4 and hence opens the telephone 1.

As noted earlier, it is possible to configure the hinge such that a button may be pressed to automatically open the handset. However, in the present embodiment, in order to move the cover completely from the closed position to the open position, a continuous turning moment must be applied throughout all intermediate positions between open and closed.

The undercut region 20 could be positioned anywhere on the cover 2. The position shown in the drawings of this embodiment shows an advantageous location. Since the user will hold the handset in his hand with the hinge closer to his thumb, forefinger and index finger than to his other fingers, the undercut has been positioned closer to the hinge so that the thumb and or the index finger can be used to engage with the undercut.

In another embodiment, the cover 2 is biased, using springs or other resilient means within the hinge mechanism, towards the open and/or the closed position. The hinge mechanism thus assists the user in opening and or closing the telephone.

Figure 2A:
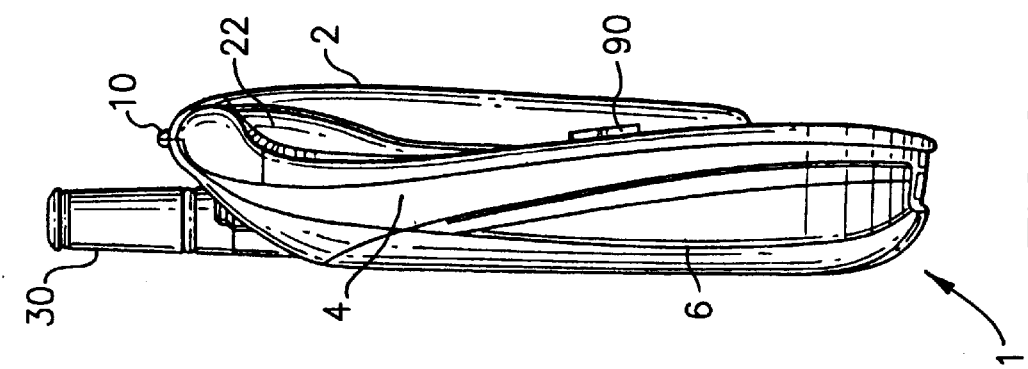
FIG. 2a shows a side view of the telephone in the closed position.

FIG. 4 shows the telephone being held in the right hand, but the telephone is equally operable by left-handed users. FIGS. 2a and 3a clearly show formation 22 which allows the telephone 1 to be opened equally easily by left-handed users as well as right-handed users. Indeed, some users may find it easier to use both projections 20 and 22 simultaneously in conjunction with ridge 10 to open the telephone 1.

The present invention includes any novel feature or combination of features disclosed herein either explicitly or any generalisation thereof irrespective of whether or no t it relates to the claimed invention or mitigates any or all of the problems addressed.

In view of the foregoing description it will be evident to a person skilled in the art that various modifications may be made within the scope of the invention.

What is claimed is:

1. A handset comprising a cover and a base, said handset being operable to move between an open position in which said cover and base are arranged to allow access to a plurality of keys, and a closed position, the cover being attached for rotation with respect to the base about a hinge axis and comprising:

a first formation for enabling a first force to be applied to rotate the cover about the hinge axis to open the handset; and a second formation for enabling a second force to be applied to rotate the cover about the hinge axis to open the handset, the first and second formations being on opposing sides of the hinge axis and being arranged so that the first force and the second force combine to produce a turning moment which acts to move the cover from the closed position to the open position.

2. A handset as claimed in claim 1 wherein the first formation is a projection.

3. A handset as claimed in claim 2 wherein the projection is a ridge positioned proximal and substantially parallel to the axis of the hinge.

4. A handset as claimed in claim 1 wherein the second formation is a recess in the profile of the closed handset.

5. A handset as claimed in claim 4 wherein the second formation is adjacent the hinge.

6. A handset as claimed in claim 4 further comprising a second recess wherein said first and second recesses are positioned adjacent opposing ends of the hinge.

7. A handset as claimed in claim 1 wherein said cover comprises a display.

8. A handset as claimed in claim 1 wherein the attachment for rotation between the base and the cover is such that a manual moment must be applied for all relative positions of the cover and base between the open and closed positions to move the handset between the open and closed positions.

9. A handset as claimed in claim 1 wherein the base comprises a housing for a battery.

10. A portable radiotelephone comprising a cover and a base, said cover and base being hingedly connected together towards one end of the telephone, said telephone being operable in an open position in which said cover and base are arranged to allow access to a plurality of keys, and a closed position in which the profile of the telephone is minimized, wherein means are provided to facilitate opening of said telephone, said means comprising:

a first formation, positioned on the cover of the telephone towards a first end of the cover, enabling a first force to be applied to said hinge; and a second formation, positioned on the cover of the telephone towards an opposite end of the cover to said first end, enabling a second force to be applied to said hinge, said first formation and said second formation being arranged such that said first force and said second force combine to produce a turning moment causing the telephone to move from the closed to open position.

11. A handset as claimed in claim 1 wherein said first force and said second force can be applied by a single hand of a user of said handset and said first and second formations are arranged so that the first force and the second force are applied in substantially opposite directions.

12. A portable radio telephone as in claim 10 wherein said first force and said second force can be applied by a single hand of a user of said radiotelephone and said first and second formations are arranged so that the first force and the second force are applied in substantially opposite directions.

13. A handset as claimed in claim 11 wherein said first force and said second force are applied by the fingers of said single hand.

14. A handset as claimed in claim 12 wherein said first force and said second force are applied by the fingers of said single hand.

* * * * *